(12) United States Patent
Tracht et al.

(10) Patent No.: US 8,075,053 B2
(45) Date of Patent: Dec. 13, 2011

(54) SEAT

(75) Inventors: Michael Tracht, Ingolstadt (DE);
Rainer Penzel, Freising (DE)

(73) Assignee: Lear Corporation, Southfield, MI (US)

( * ) Notice: Subject to any disclaimer, the term of this patent is extended or adjusted under 35 U.S.C. 154(b) by 257 days.

(21) Appl. No.: 11/996,474

(22) PCT Filed: Jul. 22, 2005

(86) PCT No.: PCT/EP2005/008037
§ 371 (c)(1),
(2), (4) Date: Feb. 8, 2008

(87) PCT Pub. No.: WO2007/009480
PCT Pub. Date: Jan. 25, 2007

(65) Prior Publication Data
US 2008/0203787 A1    Aug. 28, 2008

(51) Int. Cl.
*B60R 21/207* (2006.01)
(52) U.S. Cl. .............................. 297/216.13; 280/730.2
(58) Field of Classification Search ............. 297/216.13; 280/730.2
See application file for complete search history.

(56) References Cited

U.S. PATENT DOCUMENTS

| | | | |
|---|---|---|---|
| 5,826,938 A | 10/1998 | Yanase et al. | |
| 5,845,930 A * | 12/1998 | Maly et al. | 280/730.2 X |
| 5,890,733 A * | 4/1999 | Dillon | 280/730.2 X |
| 6,050,636 A * | 4/2000 | Chevallier et al. | 297/216.13 |
| 6,386,577 B1 * | 5/2002 | Kan et al. | 297/216.13 X |
| 6,439,597 B1 * | 8/2002 | Harada et al. | 297/216.13 |
| 6,578,911 B2 * | 6/2003 | Harada et al. | 297/216.13 |
| 7,195,277 B2 | 3/2007 | Tracht et al. | |
| 7,290,793 B2 | 11/2007 | Tracht | |
| 7,393,005 B2 | 7/2008 | Inazu et al. | |
| 7,540,529 B2 | 6/2009 | Tracht et al. | |
| 7,891,701 B2 | 2/2011 | Tracht et al. | |
| 2004/0227335 A1 | 11/2004 | Acker et al. | |
| 2005/0006933 A1 | 1/2005 | Bargheer et al. | |
| 2006/0113759 A1 | 6/2006 | Tracht et al. | |
| 2006/0113760 A1 | 6/2006 | Tracht et al. | |

FOREIGN PATENT DOCUMENTS

| | | |
|---|---|---|
| CN | 1071648 C | 9/2001 |
| CN | 1810549 A | 8/2006 |
| DE | 297 07 182 | 7/1997 |
| DE | 29707182 | 7/1997 |
| DE | 198 60 312 | 7/1999 |
| DE | 19915831 | 10/2000 |
| DE | 102 38 909 | 10/2003 |

(Continued)

OTHER PUBLICATIONS

International Search Report for International Application No. PCT/EP2005/008037, filed Jul. 22, 2005.

(Continued)

*Primary Examiner* — Anthony D Barfield
(74) *Attorney, Agent, or Firm* — Brooks Kushman P.C.

(57) ABSTRACT

A seat having a seat structure, a cover, and a back panel having at least one lateral wall covering a receiving space in a side wall of a backrest in which a side airbag module is arranged. An airbag will deploy between cover and free end of the lateral wall in a deployment direction. The lateral wall is fastened within the receiving space with at least one wall fastener arranged on an inner surface of the lateral wall.

27 Claims, 3 Drawing Sheets

FOREIGN PATENT DOCUMENTS

| | | |
|---|---|---|
| DE | 10238909 | 10/2003 |
| DE | 10 2005 005 886 | 9/2005 |
| DE | 10 2005 017 395 | 11/2006 |
| EP | 0 782 944 | 7/1997 |
| EP | 0782944 | 7/1997 |
| EP | 1375264 A1 | 1/2004 |
| FR | 2861352 A1 | 4/2005 |
| FR | 2866295 | 8/2005 |
| JP | 9254735 | 9/1997 |

OTHER PUBLICATIONS

German Office Action for the corresponding German patent application 11 2005 003 644.8 mailed Nov. 27, 2008.

Chinese Patent Office, AFD Intellectual Property Law Office First Office Action for the corresponding CN Patent Application No. 200580051540.1 mailed Oct. 10, 2009.

U.S. Appl. No. 12/984,841, filed Jan. 5, 2011; Tracht et al.

* cited by examiner

SEAT

A seat, in particular a backrest of it, comprises a seat structure, a cover and a back panel, which back panel has at least one lateral wall covering a receiving space formed in a side wall of the backrest in which a side airbag module (SAM) is arranged, wherein in case of activation an airbag will deploy between cover and free end of the lateral wall in a deployment direction.

Such seat with SAM is disclosed by EP 0 768 216 B1. The SAM comprises an inflatable airbag and further parts like an inflator means, a collision sensor, an electric controller, etc. The cover of the backrest is guided to the receiving space along a side wall of the backrest and in case of activation the airbag will deploy between the cover and a free end of the lateral wall of the back panel. To obtain enough space for such a deployment, the lateral wall is connected to the rest of the back panel along the vertical groove which acts as a hinge element for opening the lateral wall in case of airbag deployment.

According to this known prior art, it is possible that the lateral wall does not appropriately close the receiving space such that gaps are visible from the outside, for example between cover and free end of the lateral wall, where the airbag will deploy upon inflation. Moreover, it is possible that because of the groove between the lateral wall and the rest of the back panel, the lateral wall opens in case, for example, the user of the seat touches the lateral wall such that the receiving space and the airbag module arranged therein become visible. Moreover, also the groove may be visible from the outside, wherein the overall optical appearance of the seat, or in particular the backrest of the seat, is deteriorated.

It is an object of the invention to provide a seat with an excellent outer appearance, wherein the danger of an inadvertent opening of the lateral wall is substantially reduced and wherein the deployment of the airbag is by no means negatively influenced.

This object is solved by a seat with the features of claim 1.

According to the invention, the lateral wall is fastened within the receiving space with at least one wall fastening means arranged on an inner surface of the lateral wall. By such features a free end of the lateral wall is not changed by any means such that there is a smooth transmission between this free end and the cover. On the other side it is no longer possible to inadvertently open the lateral wall by, for example, a user of the seat, such that the airbag module may be influenced by touching same or by damaging it. Moreover, no dust or the like can enter the receiving space. As the corresponding wall fastening means are arranged on an inner surface of the lateral wall, they do not influence the outer appearance. Consequently, the seat is improved without changing the optical appearance, wherein also any groove or the like in the wall of the back panel, in particular where the lateral wall is fixed, is no longer necessary.

It may be considered as sufficient when the cover is guided along the side wall of the backrest just as far that the free end of the lateral wall can cover the corresponding end of the cover. However, to fix the cover and to securely hide the end of the cover, the cover can be guided into said receiving space and fastened to a part of the structure and/or the airbag module by a corresponding cover fastening means.

There are different possibilities for fixing or fastening the side airbag module within the receiving space. According to one advantageous possibility, the airbag module may comprise a mounting means for fastening the airbag module. In case such mounting means is part of the SAM, it can be arranged at same directly at the producer of the SAM and may later be used for fastening it within the receiving space.

In case the SAM is not only to be fastened by the corresponding mounting means but should also be supported by same during transport and during assembly in the backrest, such mounting means may comprise at least a mounting plate which can, in particular, be releasably fixed to the seat structure. Such mounting plate may be arranged on that side of the SAM where it is fixed to the seat structure. The mounting plate may also partially encompass the SAM for securing same during transport. The mounting plate may be releasably fixed to the SAM.

One possibility of securely fastening the mounting plate to the SAM is to assign same to the inflator means of the SAM. Such inflator means is a relatively rigid construction, such that a connection between the inflator means and the mounting plate will be sufficiently secure without badly influencing the soft parts of the SAM.

It is, of course, also possible that the mounting means is assigned to the inflator means without using such a mounting plate. One possibility for such mounting means is, for example, a bolt extending from the inflator means which may be secured to the seat structure with or without a mounting plate by a corresponding nut.

The seat structure also comprises at least one bracket, in particular in the form of a stamped out tongue, which cooperates with the mounting means. By such a bracket more flexible positioning of the SAM or its mounting means is possible.

A simple possibility for a wall fastening means is a hook-like element which can be inserted in a hook-in opening formed within the receiving space. This hook-like element may have some flexibility to support the fastening of the lateral wall by inserting the hook-like element in the hook-in opening, wherein this flexibility is also used for pivoting or opening lateral-wall in case of airbag deployment.

Different possibilities are given for such a hook-in opening, wherein according to one embodiment it is formed in a part of the seat structure, in particular in a second bracket formed by a stamped out tongue of the seat structure. This second bracket may be arranged opposite to the other or fixed bracket used for fixing the SAM. It is also possible that such a hook-in opening is formed in an inner wall of the receiving space formed by other parts of the seat structure or the backrest.

According to a further embodiment of the wall fastening means it comprises a retainer with a predetermined breaking point. This breaking point will break in case of airbag deployment.

For such a reason it may be considered as advantageous if the breaking point is essentially situated along the deployment direction of the airbag.

According to one advantageous embodiment of the invention, the retainer may be fixed to the seat structure and/or the mounting plate of the airbag module.

In case such mounting plate is used, it may also be an advantage when the cover is fixed to the mounting plate inside the receiving space by a corresponding cover fastening means.

To avoid any influence of the fastening of the cover in case of airbag deployment and when the lateral wall opens, cover and lateral wall are fastened inside the receiving space independent from each other.

The retainer may be formed as a separate part that is fixed to the inner surface of the lateral wall, but it is also possible that lateral wall and retainer are a one-part object, for example, formed by a corresponding kind of plastic material.

For securely fixing the retainer in the receiving space, the retainer may comprise a head piece in which a clamping piece of the seat structure and/or the mounting plate is inserted, wherein the breaking point is arranged between the head piece and the lateral wall.

The side airbag module used according to the invention may be a hard cover or a soft cover module. In case a soft cover module is used it may be advantageous to arrange a package plate between lateral wall and SAM. This package plate at least laterally supports the SAM which is advantageous for a soft cover module.

The package plate may, in particular, be releasably fixed to the SAM. The fixing may be realized prior to assembling the airbag module in the backrest such that package plate and possible mounting plate are a kind of cover of the SAM. For such a reason it may be advantageous if the package plate is also releasably fixed to the mounting plate. Package plate and mounting plate may be fixed to the same part of the SAM, wherein it is also possible to use only one fixing means for fixing both plates.

It is also possible to use only one fixing means for fixing inflator means and package plate together to the mounting plate and/or the seat structure.

According to a further embodiment of the invention, it is also possible that the wall fastening means cooperates with the package plate.

One possibility of such cooperation is that the wall fastening means comprises at least one hook-like element and/or one insertion element which is inserted in a receiving means or receives a hook-like element of the package plate, respectively. Accordingly, it is no longer necessary to fasten the lateral wall to any other part of the seat structure or to the mounting plate, but lateral wall and package plate are directly connected.

Of course, the connection will be in such a way that the deployment of the airbag is not influenced. This means that the package plate also has a free end near the free end of the lateral wall, such that both may be moved by the deployment of the airbag and that the fastening of the lateral wall to the seat structure or the mounting plate of the SAM is replaced by this connection of package plate and lateral wall.

According to a simple embodiment of the invention, such insertion element and/or hook-like element of the package plate are, in particular, formed as stamped-out parts of the package plate.

The package plate may have a simple construction; wherein it has at least a first wall portion used for fixing to the seat structure and/or the mounting plate and a second wall portion used for fixing said lateral wall.

To obtain a compact SAM with mounting and package plate it is possible that the first and second wall portions of the package plate are arranged essentially perpendicular to each other.

According to the invention, it should be prevented that any material from inside the backrest will be set free during deployment of the airbag. One possibility in this respect is that a seat cushion material, like foam or the like, is arranged between cover and seat structure and/or mounting plate, wherein seat structure, mounting plate and lateral wall or package plate essentially encompass the receiving space at least in the area where the SAM is arranged.

It is also possible to arrange more than one fastening means for cover and lateral wall. To prevent any influence of the different fastening means it might be advantageous when fastening means of lateral wall and fastening means of cover are arranged in different heights or levels along a longitudinal direction of the backrest.

One possibility for such an arrangement is that the fastening means of the lateral wall and the cover wall are alternately arranged along said vertical direction.

In the following, advantageous embodiments of the invention are explained in connection with the figures.

Figure 1:
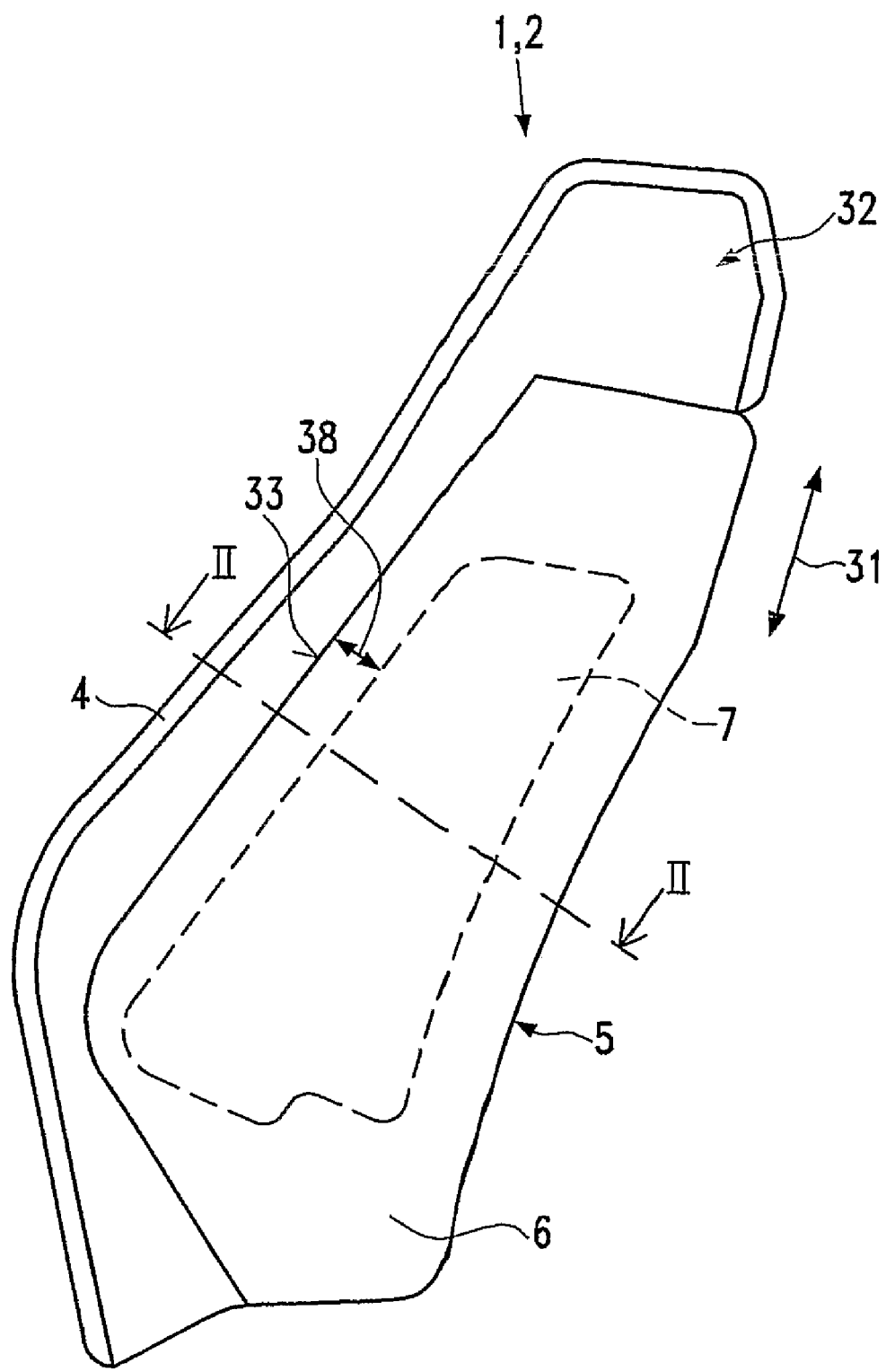
FIG. 1 shows a lateral view of a backrest of a seat of a vehicle.

In FIG. 1 a lateral view of a part of a seat 1 of a vehicle, in particular of a backrest 2, is shown. The backrest 2 comprises cover 4, a seat structure 3, see also the following figures, which is arranged within the backrest, and a back panel 5. This back panel 5 has at least one lateral wall 6 extending to the front of the backrest and covering a receiving space 7 in a side wall 32 of the backrest 2 in which a side airbag module (SAM) is arranged. This SAM 8 will be explained in more detail with respect to the following figures.

The lateral wall 6 of the back panel 5 has a free end 33 which covers the cover 4 and between which and the cover a corresponding airbag will deploy in a deployment direction 34, see the following figures.

The corresponding SAM 8 may be arranged in any seat of the vehicle and in particular in those side walls 32 of such a seat which are arranged nearest to vehicle doors.

In the following FIGS. 2 to 5 four different embodiments of the invention are disclosed, wherein the corresponding cross-sections of those figures are cross-sections along the line II-II of FIG. 1. The same parts of the seat always have the same reference numeral and some reference numerals may only be described with respect to one of the following figures.

Figure 2:
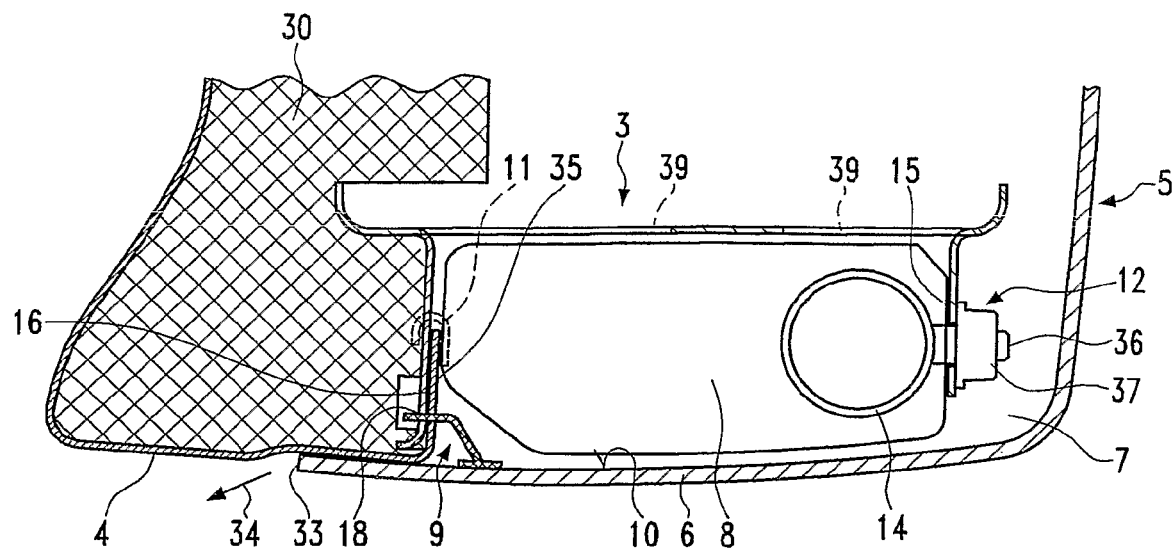
FIG. 2 shows a cross-section of the backrest according to FIG. 1 along line II-II with a first embodiment of the invention.

In FIG. 2 the first cross-section along line II-II for a first embodiment is shown.

In this embodiment a fastening means 9 is arranged on an inner surface 10 of lateral wall 6 of back panel 5 in a distance to the free end 33 of this lateral wall 6. The fastening means 9 has the form of a hook-like element 17 and may be a separate part or also an integrated part of the lateral wall 6. A free end of the hook-like element 17 is arranged in a hook-in opening 18 formed in a bracket 16 which is part of the seat structure 3. This bracket 16 is formed by stamping out a part of the seat structure, see reference numeral 39 and is then bent towards the lateral wall 6.

This bracket 16 is also used for fixing cover free end 35 of cover 4, for example by clips 11 as corresponding cover fastening means.

With respect to the fixing of the lateral wall and the cover it is advantageous when both fastening means are arranged in different levels along a longitudinal direction 31, see FIG. 1, of the backrest such that fastening of cover 4 and lateral wall 6 do not interfere with each other. Moreover, there may be a number of such cover fastening means 11 or wall fastening means 9 for fastening the cover 4 or the lateral wall 6, respectively.

Within the corresponding receiving space 7 formed in side wall 32 of the backrest 2, the SAM 8 is arranged. Such SAM may be a hard cover or soft cover module and comprises all parts necessary for inflating an airbag such as the airbag itself, inflator means 14, a collision sensor or the like and means for mounting the SAM within the receiving space 7.

In the embodiment according to FIG. 2, a corresponding mounting means 12 of the SAM 8 comprises a further bracket 15 stamped out of the seat structure 3, a bolt 36, see also the following figures, extending radially outward from the inflator means 14 and a nut 37, see again the following figures.

To securely cover the receiving space 7, the lateral wall 6 extends in direction to a front part of the backrest such that it extends along cover 4, wherein between free end 33 of the lateral wall 6 and the corresponding part of the cover, an inflated airbag will be deployed, see also the corresponding deployment direction 34.

The corresponding hook-like element 17 is deformable such that the inflating airbag will push the lateral wall 6 outwards by deforming the hook-like element 17 and disengaging same from the hook-in opening 18. The hook-like element 17 is bent such that the inflating airbag will not be damaged by any protruding parts of this element.

Figure 3:
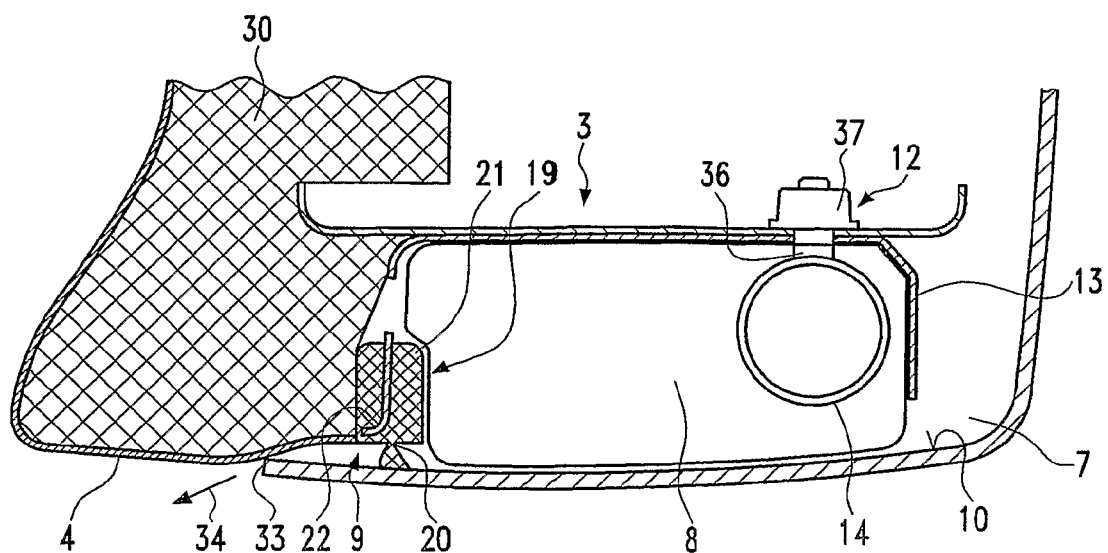
FIG. 3 shows a cross-section similar to FIG. 2 for a second embodiment of the invention.

In FIG. 3 the second embodiment of the invention is illustrated.

Here, the corresponding seat structure 3, assigned to and also limiting the corresponding receiving space 7, is a plate-like element with rounded edges. For fixing the SAM 8 to this seat structure 3 an additional mounting plate 13 is arranged. This may be fixed to the SAM 8 before it is assembled in the seat but may also be fixed to the seat structure 3 prior to assembling the SAM 8. In both cases, SAM 8 is fixed to the seat structure by the corresponding bolt 36 and nut 37 connection, wherein this connection is also used for fixing mounting plate 13 to the seat structure.

The arrangement of the inflator means 14 is slightly different in FIG. 3 compared to FIG. 2, wherein both kinds of arrangement or fixing of the inflator means 14 are possible for all embodiments, see also the following figures.

The mounting plate 13 at least partially encompasses SAM 8 wherein one end of the mounting plate, see clamping piece 22, is also used for fastening the lateral wall 6 and is also used for fastening the cover 4. Fastening of the cover may be realized in the same way as in FIG. 2, wherein corresponding clips or cover fastening means 11 will be inserted in corresponding holes formed in the mounting plate 13.

Corresponding clamping piece 22 of the mounting plate 13 is inserted in a head piece 21 of a retainer 19. This retainer 19 is arranged on the inner surface 10 of the lateral wall 6 and may be fixed to the surface or also may be an integrated part of the lateral wall. Between the head piece 21 and the inner surface 10 of lateral wall 6 a predetermined breaking point 20 is arranged which will break during inflation of the airbag such that the airbag may be deployed along deployment direction 34 between free end 33 of the lateral wall 6 and the corresponding part of cover 4.

In all the embodiments according to FIGS. 2 to 5, the corresponding receiving space 7 at least in the area where the SAM 8 is arranged is more or less encompassed by seat structure 3, and/or mounting plate 13 and/or lateral wall 6, such that any seat cushion material 30 arranged between cover 4 and seat structure 3 will not spill from the receiving space during airbag deployment.

Figure 4:
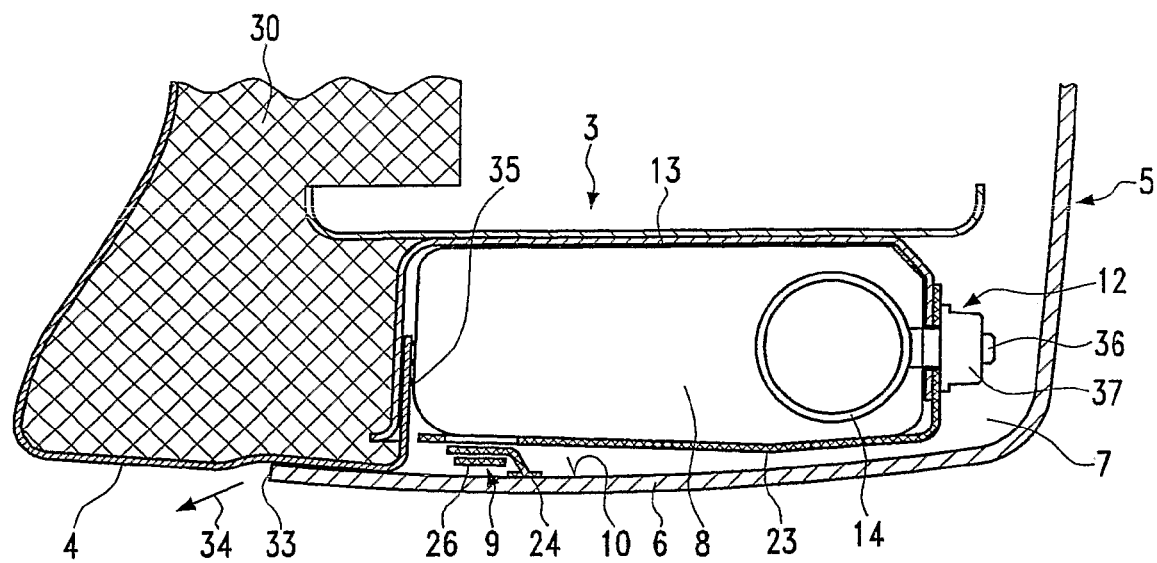
FIG. 4 shows a cross-section similar to FIG. 2 for a third embodiment of the invention.
Figure 5:
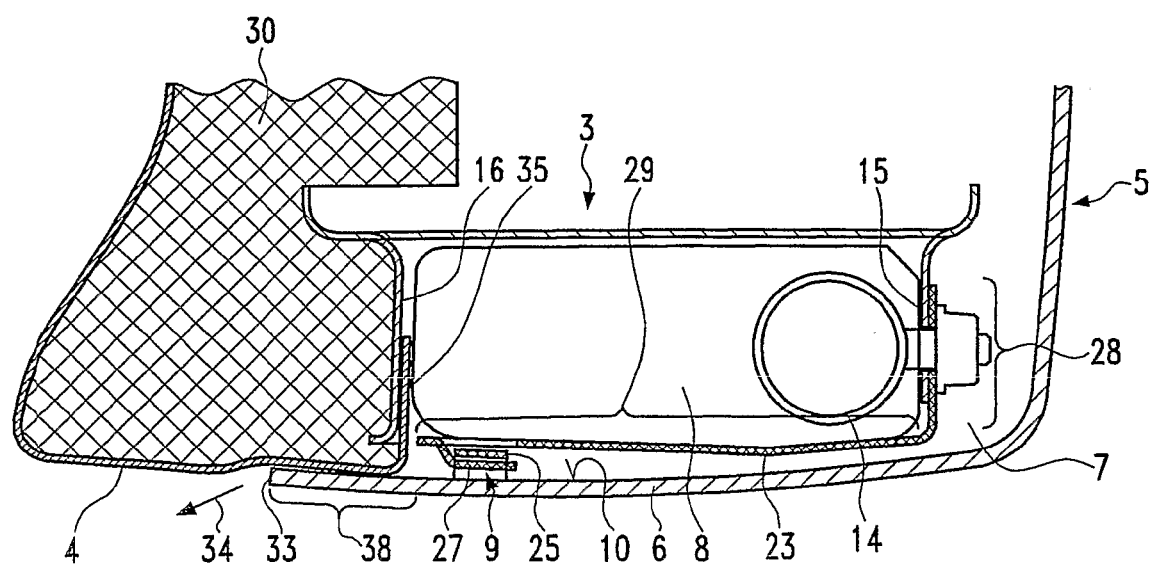
FIG. 5 shows a cross-section similar to FIG. 2 for a fourth embodiment of the invention.

In case a soft cover SAM 8 is used, it is advantageous to additionally arrange a package plate 23 between SAM 8 and inner surface 10 of lateral wall 6, see the embodiments according to FIGS. 4 and 5.

In FIG. 4 the package plate 23, see also FIG. 5, comprises a first wall portion 28 and a second wall portion 29 which extend essentially perpendicular to each other. The first wall portion 28 is used for fixing the package plate 23 to mounting plate 13 by using the corresponding bolt 36 and nut 37 connection of the inflator means 14. The mounting plate 13 is fixed to the seat structure 3 wherein the corresponding fastening means is not shown in FIG. 4. The fastening means for the mounting plate 13 may be a corresponding bolt-nut connection or any other kind of releasable fastening means, but the mounting plate may also be fixed to the seat structure by welding or the like.

SAM 8 is arranged between mounting plate 13 and package plate 23 and may be transported together with both, such that sensitive parts of the SAM are protected by both plates. The mounting plate 13 is also used for fixing cover free end 35, see for example the embodiment according to FIG. 2.

In the embodiments according to FIGS. 4 and 5, the lateral wall 6 is not directly connected to seat structure 3 or mounting plate 13, but corresponding fastening means 9 are arranged between package plate 23 and inner surface 10 of lateral wall 6. A further connection between lateral wall 6 and, for example, seat structure 3 is not necessary according to those embodiments.

The fastening means 9 according to FIG. 4 are realized by a hook-like element 24 similar to FIG. 2 protruding from the inner surface 10 of the lateral wall which is inserted in corresponding receiving means 26 of package plate 23. This receiving means 26 may be a stamped-out part of package plate 23 and may extend from same in direction to inner surface 10.

Upon inflation of the airbag, both package plate 23 and lateral wall 6 will be pushed outwards such that the airbag can be deployed along deployment direction 34 between free end 33 of lateral wall 6 and the cover 4 arranged along sidewall 32 and fixed with its cover free end 35 in the receiving space 7. Again, the corresponding fastening means 11, see also FIG. 2, at the cover free end 35 may be realized by corresponding clips or the like fixed to mounting plate 13 and/or corresponding bracket 16 of seat structure 3, see FIG. 5.

The embodiment illustrated in FIG. 5 does not use any mounting plate 13 but uses corresponding brackets 15 and 16, see also FIG. 2, for fixing cover free end 35 and also for fixing SAM 8 and package plate 23 by the corresponding bolt 36 and nut 37 connection.

The two brackets 15 and 16 are again stamped out from the plate-like seat structure 3.

The fastening means 9 for lateral wall 6 may be the same as those of FIG. 4, but may also be different as now illustrated in FIG. 5. This fastening means 9 comprises an insertion element 25 arranged on the inner surface 10 of lateral wall 6 and hook-like element 27 as part of package plate 23. Again, the hook-like element 27 may be formed by stamping out a corresponding portion of package plate 23.

As no mounting plate 13 is used in the embodiment according to FIG. 5, the corresponding package plate 23 is fastened together with inflator means 14 to corresponding bracket 15 of seat structure 3.

According to the invention it is possible to directly fasten a lateral wall within the receiving space wherein the corresponding fastening means 9 are arranged on the inner surface 10 of the lateral wall 6 and in a distance from free end 33 of lateral wall 6. The back panel 5 together with the lateral wall 6 always has the same wall thickness such that the manufacturing of the back panel is simplified. Moreover, cover 4 and end of lateral wall 6 always overlap each other, see overlap portion 38 for example in FIG. 5, such that a corresponding receiving space 7 is securely covered.

The invention claimed is:
1. A seat having a backrest comprising:
a seat structure;
a cover;

a back panel having a lateral wall covering a receiving space in a side wall of the backrest in which a side airbag module (SAM) having an inflator and an airbag is arranged, the lateral wall having a free end, an inner surface, and a wall fastening hook arranged on the inner surface; and a package plate disposed between the lateral wall and the SAM;

wherein the airbag will deploy between the cover and the free end in a deployment direction; and wherein the lateral wall is fastened within the receiving space to the package plate with the wall fastening hook.

2. The seat of claim 1 wherein the cover is guided into the receiving space and fastened to a part of the seat structure and/or the SAM by a corresponding cover fastening means.

3. The seat of claim 1 wherein the SAM comprises a mounting means for fastening the SAM in the receiving space.

4. The seat of claim 3 wherein the mounting means includes a mounting plate that is releasably fixed to the seat structure.

5. The seat of claim 4 wherein the mounting plate is mounted to the inflator.

6. The seat of claim 4 wherein the seat structure comprises a bracket that cooperates with the mounting means to secure the SAM.

7. The seat of claim 4 wherein a seat cushion material is arranged between the cover and the seat structure and the mounting plate, wherein the seat structure, mounting plate and lateral wall or package plate substantially encompass the receiving space in the area where the SAM is arranged.

8. The seat of claim 1 wherein the cover and lateral wall are fastened inside the receiving space independently from each other.

9. The seat of claim 1 wherein the wall fastening hook comprises an insertion element that engages the package plate.

10. The seat of claim 9 wherein the insertion element is integrally formed with the package plate.

11. The seat of claim 1 wherein the package plate has a first wall portion mounted to the seat structure and second wall portion mounted to the lateral wall.

12. The seat of claim 11 wherein first and second wall portions are arranged substantially perpendicular to each other.

13. A seat comprising:
a seat structure;
a cover;
a back panel having a lateral wall covering a receiving space in a side wall of a backrest in which a side airbag module (SAM) having an inflator and an airbag is arranged, the lateral wall having a free end, an inner surface, and a wall fastener arranged on the inner surface; and
a package plate disposed between the lateral wall and the SAM, the package plate having a receiving means configured to engage the wall fastener;

wherein the airbag will deploy between the cover and the free end in a deployment direction when the wall fastener and receiving means disengage.

14. The seat of claim 13 wherein the cover is fixed inside the receiving space to a mounting plate disposed on the seat structure.

15. The seat of claim 13 wherein the package plate is spaced apart from the lateral wall and the SAM.

16. The seat of claim 13 wherein the package plate is releasably fixed to the SAM.

17. The seat of claim 13 wherein the package plate is releasably fixed to a mounting plate disposed on the seat structure.

18. The seat of claim 13 wherein the inflator and the package plate are both fixed to the mounting plate and/or the seat structure.

19. The seat of claim 13 wherein the wall fastener is disposed proximate an end of the package plate.

20. A seat comprising:
a seat structure having first and second brackets;
a cover; and
a back panel having a lateral wall covering a receiving space in a side wall of a backrest in which a side airbag module (SAM) having an inflator and an airbag is arranged, the lateral wall having a free end, an inner surface, and a wall fastener arranged on the inner surface and that engages the second bracket and is spaced apart from the SAM prior to deployment of the airbag;
wherein the first and second brackets are spaced apart from each other and extend toward the back panel such that the first and second brackets are spaced apart from the back panel and the side airbag module (SAM) engages the first bracket; and
wherein the airbag will deploy between the cover and the free end in a deployment direction when the wall fastener disengage.

21. The seat of claim 20 wherein the wall fastener is inserted into a hook-in opening in the second bracket.

22. The seat of claim 21 wherein the back panel extends along a rear surface of the seat disposed opposite a seat cushion.

23. The seat of claim 21 wherein the hook-in opening is formed in an inner wall of the receiving space.

24. The seat of claim 20 wherein the side airbag module (SAM) is spaced apart from the second bracket.

25. The seat of claim 24 wherein the predetermined breaking point is situated along the deployment direction of the airbag.

26. The seat of claim 20 wherein the wall fastener of the lateral wall and a cover fastening means of the cover are arranged in different heights along a longitudinal direction of the backrest.

27. The seat of claim 20 wherein the wall fastener and a cover fastening means are alternately arranged in a longitudinal direction of the backrest.

* * * * *